US00RE39194E

(19) United States
(12) Reissued Patent
Blalock

(10) Patent Number: US RE39,194 E
(45) Date of Reissued Patent: Jul. 18, 2006

(54) METHOD AND APPARATUS FOR CONTROLLING PLANARIZING CHARACTERISTICS IN MECHANICAL AND CHEMICAL-MECHANICAL PLANARIZATION OF MICROELECTRONIC SUBSTRATES

(75) Inventor: Guy Blalock, Boise, ID (US)

(73) Assignee: Micron Technology, Inc., Boise, ID (US)

(21) Appl. No.: 10/013,333

(22) Filed: Dec. 6, 2001

Related U.S. Patent Documents

Reissue of:
(64) Patent No.: 5,997,384
Issued: Dec. 7, 1999
Appl. No.: 08/995,493
Filed: Dec. 22, 1997

(51) Int. Cl.
*B24B 1/00* (2006.01)
*B24B 20/00* (2006.01)

(52) U.S. Cl. ..... 451/41; 451/285; 451/287
(58) Field of Classification Search ..... 451/41, 451/285, 286, 287, 288, 290
See application file for complete search history.

(56) References Cited

U.S. PATENT DOCUMENTS 5,635,083 A * 6/1997 Breivogel et al.
5,795,215 A * 8/1998 Guthrie et al.
5,851,136 A * 12/1998 Lee ..... 451/9

* cited by examiner

*Primary Examiner*—Dung Van Nguyen
(74) *Attorney, Agent, or Firm*—Dorsey & Whitney LLP

(57) ABSTRACT

A method and apparatus for mechanical and/or chemical-mechanical planarization of microelectronic substrates. In one embodiment, an apparatus for controlling the planarizing characteristics of a microelectronic substrate has a carrier that may be positioned with respect to a polishing medium of a planarizing machine to move with respect to a microelectronic substrate during planarization. The apparatus may also have a modulator with a contact element, and the modulator may be attached to the carrier to position at least a portion of a contact element in front of a leading edge of the substrate by a selected distance during planarization. In operation, the modulator causes the contact element to selectively engage a region of the planarizing surface to modulate the contour of the planarizing surface during planarization.

15 Claims, 7 Drawing Sheets

METHOD AND APPARATUS FOR CONTROLLING PLANARIZING CHARACTERISTICS IN MECHANICAL AND CHEMICAL-MECHANICAL PLANARIZATION OF MICROELECTRONIC SUBSTRATES

Matter enclosed in heavy brackets [ ] appears in the original patent but forms no part of this reissue specification; matter printed in italics indicates the additions made by reissue.

TECHNICAL FIELD

The present invention relates to mechanical and chemical-mechanical planarization of microelectronic substrates. More particularly, the present invention relates to controlling the planarizing characteristics of a microelectronic substrate.

BACKGROUND OF THE INVENTION

Mechanical and chemical-mechanical planarization processes remove material from the surface of semiconductor wafers, field emission displays and many other microelectronic substrates to form a flat surface at a desired elevation. FIG. 1 schematically illustrates a planarizing machine 10 with a platen or base 20, a carrier assembly 30, a polishing pad 40, and a planarizing solution 44 on the polishing pad 40. The planarizing machine 10 may also have an under-pad 25 attached to an upper surface 22 of the platen 20 for supporting the polishing pad 40. In many planarizing machines, a drive assembly 26 rotates (arrow A) and/or reciprocates (arrow B) the platen 20 to move the polishing pad 40 during planarization.

The carrier assembly 30 controls and protects a substrate 12 during planarization. The carrier assembly 30 generally has a substrate holder 32 with a pad 34 that holds the substrate 12 via suction, and an actuator assembly 36 typically rotates and/or translates the substrate holder 32 (arrows C and D, respectively). However, the substrate holder 32 may be a weighted, free-floating disk (not shown) that slides over the polishing pad 40.

The polishing pad 40 and the planarizing solution 44 may separately, or in combination, define a polishing environment that mechanically and/or chemically removes material from the surface of the substrate 12. The polishing pad 40 may be a conventional polishing pad made from a relatively compressible, porous continuous phase matrix material (e.g., polyurethane), or it may be an abrasive polishing pad with abrasive particles fixedly bonded to a suspension medium. In a typical application, the planarizing solution 44 may be a chemical-mechanical planarization slurry with abrasive particles and chemicals for use with a conventional non-abrasive polishing pad, or the planarizing solution 44 may be a liquid without abrasive particles for use with an abrasive polishing pad. To planarize the substrate 12 with the planarizing machine 10, the carrier assembly 30 presses the substrate 12 against a planarizing surface 42 of the polishing pad 40 in the presence of the planarizing solution 44. The platen 20 and/or the substrate holder 32 then move relative to one another to translate the substrate 12 across the planarizing surface 42. As a result, the abrasive particles and/or the chemicals in the polishing environment remove material from the surface of the substrate 12.

Planarizing processes must consistently and accurately produce a uniformly planar surface on the substrate to enable precise fabrication of circuits and photo-patterns on the substrate. As the density of integrated circuits increases, the uniformity and planarity of the substrate surface is becoming increasingly important because it is difficult to form sub-micron features or photo-patterns to within a tolerance of approximately 0.1 μm when the substrate surface is not uniformly planar. Thus, planarizing processes must create a highly uniform, planar surface on the substrate.

In the competitive semiconductor and microelectronic device manufacturing industries, it is also desirable to maximize the yield of individual devices or dies on each substrate. Typical semiconductor manufacturing processes fabricate a plurality of dies (e.g., 50–250) on each substrate. To increase the number of dies that may be fabricated on each substrate, many manufacturers are increasing the size of the substrates to provide more surface area for fabricating additional dies. Thus, to enhance the yield of operable dies on each substrate, planarizing processes should form a planar surface across the substrate surface.

In conventional planarizing processes, however, the substrate surface may not be uniformly planar because the rate at which material is removed from the substrate surface (the "polishing rate") typically varies from one region on the substrate to another. The polishing rate is a function of several factors, and many of the factors may change throughout the planarizing process. For example, some of the factors that effect the polishing rate across the surface of the substrate are as follows: (1) the distribution of abrasive particles and chemicals between the substrate surface and the polishing pad; (2) the relative velocity between the polishing pad and the substrate surface; and (3) the pressure distribution across the substrate surface.

One particular problem with conventional planarizing devices and methods is that the deviation of the surface uniformity in a perimeter region of the substrate is generally much greater than that of a central region. In conventional planarizing processes, the polishing rate in a 5–15 mm perimeter region at the substrate edge is generally higher than the polishing rate in a central region. One reason for the difference in the polishing rate is that the relative velocity between the substrate and the polishing pad is generally higher in the perimeter region of the substrate than the central region. Another reason for the difference in the polishing rate is that the edge of the substrate wipes a significant amount of the planarizing solution off of the polishing pad before the planarizing solution can contact the central region. Conventional planarizing devices and methods, therefore, typically produce a non-uniform, center-to-edge planarizing profile across the substrate surface.

To reduce such center-to-edge planarizing profiles, several existing polishing pads have holes or grooves that transport a portion of the planarizing solution below the substrate surface during planarization. A Rodel IC-1000 polishing pad, for example, is a relatively soft, porous polyurethane pad with a number of large slurry wells approximately 0.05–0.10 inches in diameter that are spaced apart from one another across the planarizing surface by approximately 0.125–0.25 inches. During planarization, small volumes of slurry are expected to fill the large wells, and then hydrodynamic forces created by the motion of the substrate are expected to draw the slurry out of the wells in a manner that wets the substrate surface. However, even IC-1000 pads may produce significant center-to-edge planarizing profiles indicating that the perimeter of the substrate presses some of the slurry out of the wells ahead of the center of the substrate. U.S. Pat. No. 5,216,843 describes another polishing pad with a plurality of macro-grooves formed in concentric circles and a plurality of micro-grooves radially crossing the macro-grooves. Although grooved pads may improve the planarity of the substrate surface, substrates planarized with such pads still exhibit non-uniformities across the substrate surface indicating a non-uniform distribution of planarizing solution and abrasive particles under the substrate.

Other techniques for reducing the center-to-edge planarizing profile reduce the differences in the relative velocity between the perimeter and central regions. For example, one existing planarizing machine holds the polishing pad stationary and orbits the substrate in an eccentric pattern across the polishing pad. In another related planarization process, the substrate is held in a precession wafer holder that allows the substrate to precess with respect to the wafer holder during planarization. Although reducing the difference in the relative velocity across the substrate surface reduces the center-to-edge planarizing profile, existing planarizing machines may still produce significant deviations in the surface uniformity between the perimeter region and the central region.

In light of the results of conventional planarizing devices, the deviation of the surface uniformity in the perimeter region may be so great that it impairs or ruins dies formed in the perimeter region. Thus, because a defective 5–15 mm perimeter region affects a larger surface area and more dies on a 12-inch substrate than an 8-inch substrate, the center-to-edge planarizing profile significantly impacts the yield of larger substrates.

SUMMARY OF THE INVENTION

The present invention is a method and apparatus for mechanical and/or chemical-mechanical planarization of microelectronic substrates. In one embodiment in accordance with the principles of the present invention, an apparatus for controlling the planarizing characteristics of a microelectronic substrate has a carrier that may be positioned with respect to a polishing medium of a planarizing machine. The carrier may be a substrate holder of the planarizing machine or another carrier independent from the substrate holder that moves with respect to a microelectronic substrate during planarization of the substrate. The apparatus may also have a modulator attached to the carrier, and the modulator may have a contact element for engaging the polishing medium. The modulator, for example, may be attached to the carrier to position at least a portion of the contact element in front of a leading edge of the substrate by a selected distance during planarization. In operation, the contact element selectively engages a portion of the planarizing surface proximate to the leading edge of the substrate to modulate the contour of the planarizing surface of the polishing medium.

In one particular embodiment in which the carrier is a substrate holder, the modulator is attached to the substrate holder to position the contact element superadjacent to an exposed portion of a standing wave that forms at the leading edge of the substrate during planarization. The contact element operates by engaging the exposed portion of the standing wave in a manner that modulates the contour of a residual portion of the standing wave under a perimeter region of the substrate. For example, the modulator may be a passive modulator in which the contact element has a bottom surface with a desired contour to attenuate or shift the residual portion of the standing wave. In another embodiment, the modulator may be an active modulator having an actuator that carries the contact element and a controller coupled to the actuator. The controller may be programmed to drive the actuator in a manner that selectively moves a bottom surface of the contact element against the exposed portion of the standing wave. The particular motion of the actuator may be selected to continually shift a pressure point of the residual portion of the standing wave and/or attenuate the residual portion of the standing wave. For example, the active modulator may move the contact element against the exposed portion of the standing wave in a manner that oscillates a pressure point of the residual portion of the standing wave under the perimeter region of the substrate to average the effect of the pressure point over a larger surface area on the substrate.

DETAILED DESCRIPTION OF THE INVENTION

The present invention is an apparatus and method for mechanical and/or chemical-mechanical planarization of substrates used in the manufacturing of microelectronic devices. Many specific details of certain embodiments of the invention are set forth in the following description and in FIGS. 2–5B to provide a thorough understanding of such embodiments. One skilled in the art, however, will understand that the present invention may have additional embodiments and may be practiced without several of the details described in the following description.

Figure 1:
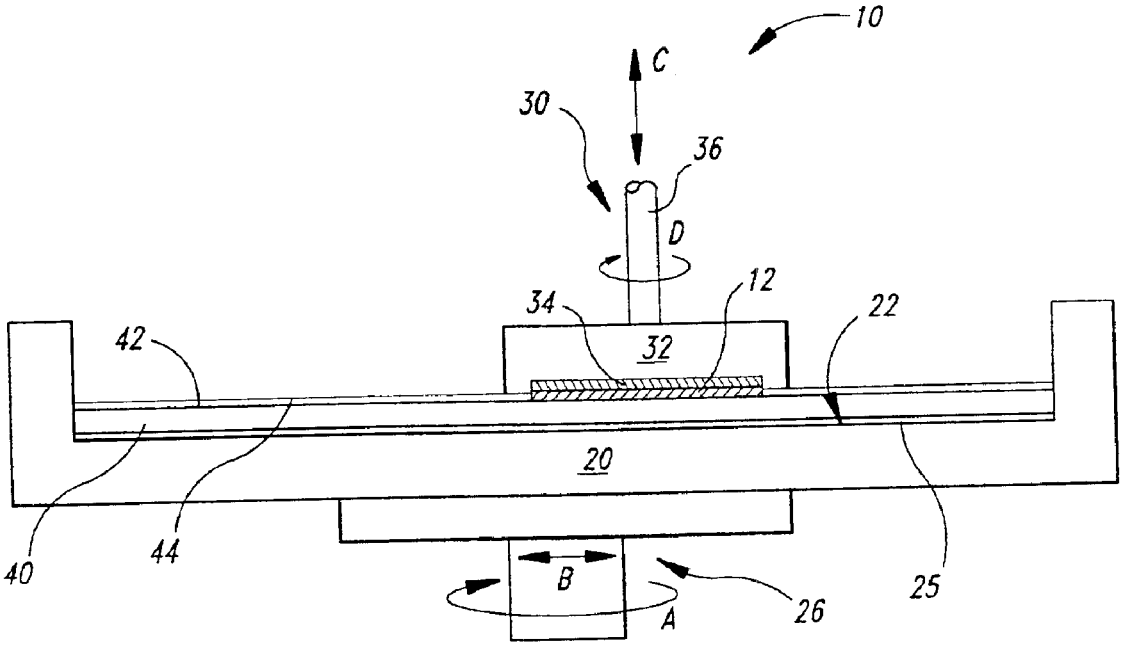
Fig. 1 (Prior Art)
FIG. 1 is a schematic view of a planarizing machine in accordance with the prior art.
Figure 2:
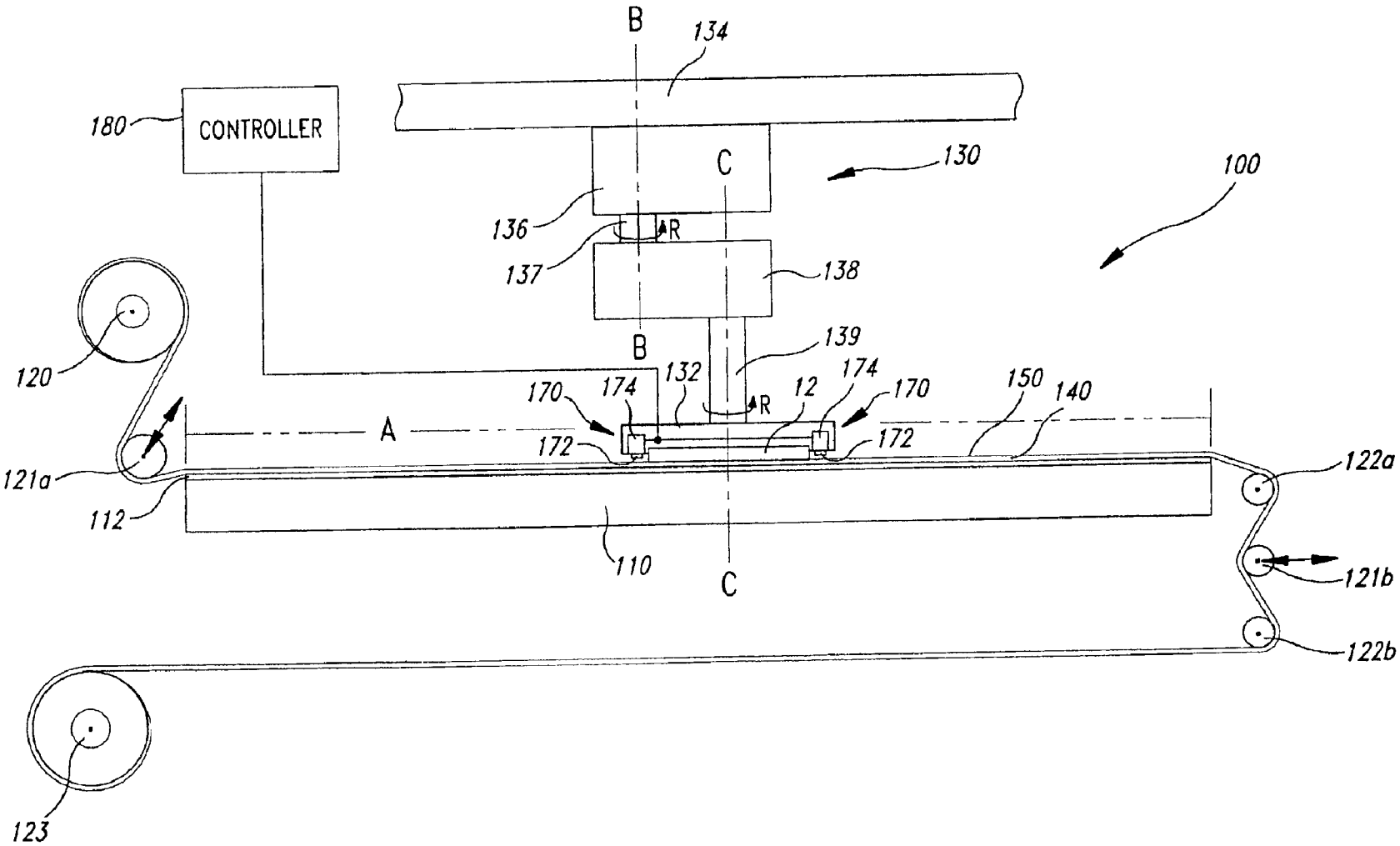
FIG. 2 is a schematic view of a planarizing machine with a device for controlling the planarizing characteristics of a microelectronic substrate in accordance with an embodiment of the invention.

FIG. 2 is a schematic view of a planarizing machine 100 in accordance with one embodiment of the invention. The planarizing machine 100 includes a carrier assembly 130 and an active modulator 170 for controlling the planarizing characteristics of a microelectronic substrate 12. The features and advantages of the modulator 170 are best understood in the context of the structure and operation of the planarizing machine 100. Thus, the general features of the planarizing machine 100 will be described initially.

The planarizing machine 100 may have a platen or a support table 110 carrying an underpart 112 at a work station or a planarization station where a section "A" of a planarizing medium 100 is positioned. The underpart 112 may be a substantially incompressible support member attached to the table 110 to provide a flat, solid surface to which a particular section of the polishing medium 140 may be secured during planarization. In other applications, however, the underpart 112 may be a compressible pad to provide a more conformal polishing medium. The planarizing machine [110] *100* also has a plurality of rollers to guide, position, and hold the polishing medium 140 over the underpart 112. In one embodiment, the rollers include a supply roller 120, first and second idler rollers 121a and 121b, first and second guide rollers 122a and 122b, and a take-up roller 123. The supply roller 120 carries an unused portion of the polishing medium 140, and the take-up roller 123 carries the used portion of the polishing medium 140. The supply roller 120 and the take-up roller 123 are driven rollers to sequentially advance the unused portion of the polishing medium 140 onto the underpart 112. As such, an unused section of the planarizing medium may be quickly substituted for a worn, used section to provide a consistent surface for planarizing the substrate. The first idler roller 121a and the first guide roller 122a position the polishing medium 140 slightly below the underpart 112 so that the supply and take-up rollers 120 and 123 stretch the polishing medium 140 over the underpart 112 to hold it stationary during planarization.

The planarizing machine 100 also has a carrier assembly 130 to translate the substrate 12 across a planarizing surface 150 of the polishing medium 140. In one embodiment, the carrier assembly 130 has a substrate holder 132 to pick up, hold and release the substrate 12 at appropriate stages of the planarization process. The carrier assembly 130 may also have a support gantry 134 carrying an actuator 136 so that the actuator 136 can translate along the gantry 134. The actuator 136 preferably has a drive shaft 137 coupled to an arm assembly 138 that carries the substrate holder 132. In operation, the gantry 134 raises and lowers the substrate 12, and the actuator 136 orbits the substrate 12 about an axis B-B via the drive shaft 137. In another embodiment, the arm assembly 138 may also have an actuator (not shown) to drive a shaft 139 of the arm assembly 138 and thus rotate the substrate holder 132 about an axis C—C in addition to orbiting the substrate holder 132 about the axis B—B.

The modulator 170 may be an active modulator 170 with a contact element 172, an actuator 174 carrying the contact element 172, and a controller 180 coupled to the actuator 174. In one embodiment, the actuator 174 is attached to the substrate holder 132 to position at least a portion of the contact element 172 in front of leading edge of the substrate 12 during planarization. For example, the actuator 174 and the contact element 172 may surround the substrate 12 so that a portion of the contact element 172 is positioned superadjacent to an area on the polishing medium 140 in front of a leading edge of the substrate 12 irrespective of the direction that the substrate holder 132 is moving. The contact element 172 may accordingly be a carrier ring that contains the substrate 12 within the substrate holder 132. As discussed in further detail below, the contact element 172 selectively engages the planarizing surface 150 to modulate the contour of the planarizing surface 150 under a perimeter region of the substrate 12.

Figure 3:
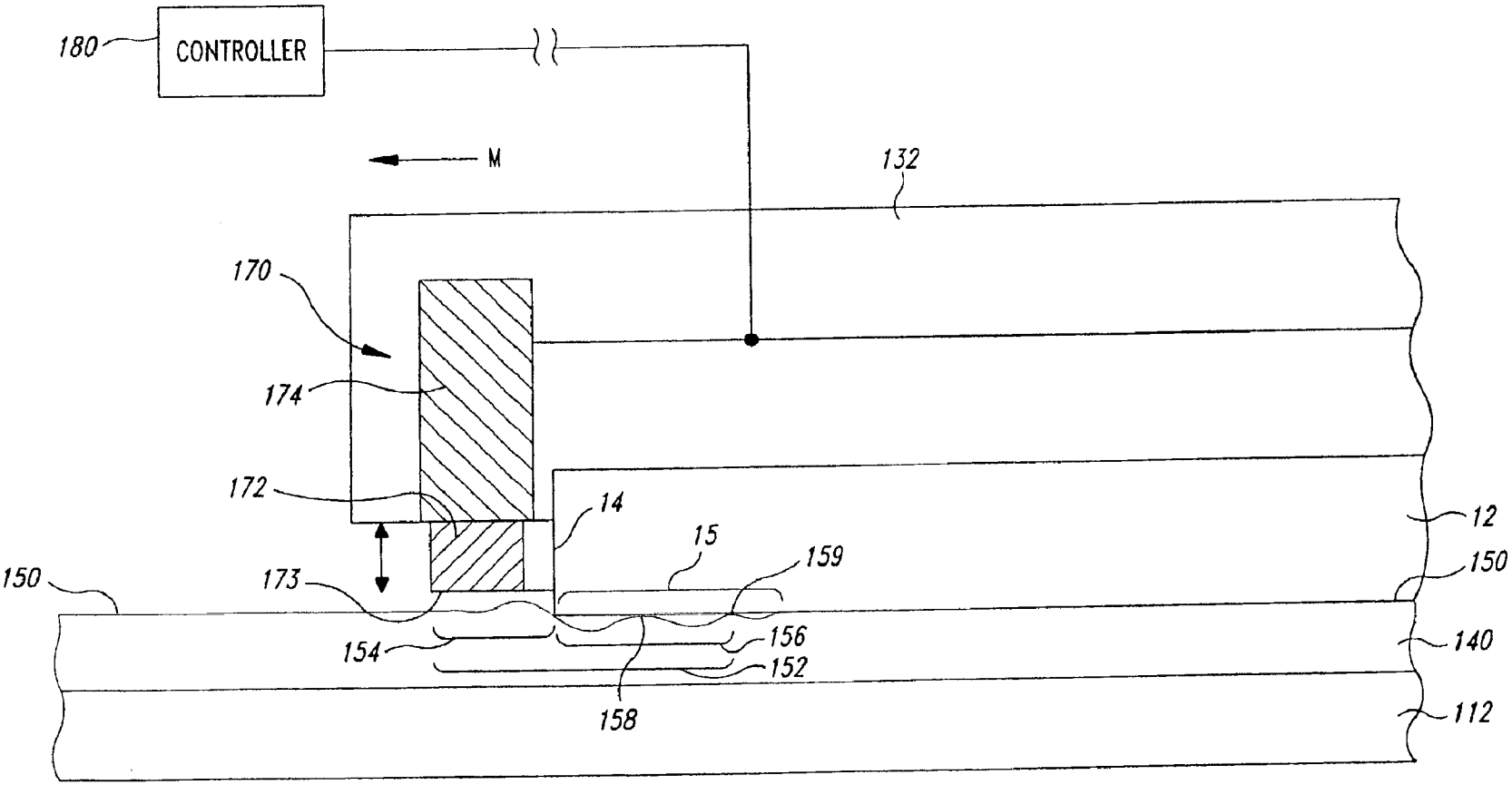
FIG. 3 is a partial schematic cross-sectional view of a planarizing machine with a device for controlling the planarizing characteristics of a microelectronic substrate in accordance with one embodiment of the invention.

FIG. 3 is a partial schematic cross-sectional view of the substrate holder 132 showing a portion of the active modulator 170 in greater detail. The actuator 174 may be a single linear displacement device or a plurality of displacement devices embedded in the substrate holder 132 in a ring around the substrate 12. The contact element 172 may thus be a ring configured to position a bottom surface 173 of the contact element 172 superadjacent to a portion of the planarizing surface 150. In one particular embodiment, the actuator 174 is a piezoelectric ring driven by electric signals from the controller 180. The contact element 172 may accordingly be a metal, ceramic or other type of ring attached to the piezoelectric actuator 174.

One aspect of the invention is the discovery that a leading edge 14 of the substrate 12 having a motion "M" forms a standing wave 152 in the planarizing surface 150 of the polishing medium 140. The particular waveform of the standing wave 152 is a function of several factors, such as the pad type, substrate structure, planarizing solution, downforce, relative velocity and other factors. The standing wave 152 shown in FIG. 3 is a schematic representation of a standing wave that does not necessarily represent the waveform of an actual standing wave. As such, the amplitude and wave length of the standing wave 152 shown in FIG. 3 are exaggerated for illustrative purposes. Additionally, a planarizing solution is not shown on top of the planarizing surface 150 for purposes of clarity, but it will be appreciated that a planarizing solution is typically dispensed onto the planarizing surface 150 during planarization.

In operation, the controller 180 drives the actuator 174 to move the contact element 172 vertically and/or horizontally with respect to an exposed portion 154 of the standing wave 152. For example, in one possible application of the active modulator 170, the actuator 174 may hold a bottom surface 173 of the contact element 172 in engagement with the planarizing surface 150 (not shown in FIG. 3) at a set position with respect to the exposed portion 154 of the standing wave 152 to alter a residual portion of the standing wave 156 with respect to the substrate 12. In another possible application of the active modulator 170, the actuator 174 may continuously move the contact element 172 in engagement with the planarizing surface 150 to continuously alter the contour of the planarizing surface 150 in a manner that produces a plurality of different waveforms on the planarizing surface 150 instead of the standing wave 152. In still another possible application of the active modulator 170, the actuator may move the contact element 172 into engagement with the planarizing surface 150 at a selected frequency, amplitude and phase with respect to the standing wave 152 to cancel the standing wave 152 on the planarizing surface 150. Thus, the controller 180 may be programmed to selectively operate the active modulator 170 in a desired manner according to the particular application.

Figure 4A:
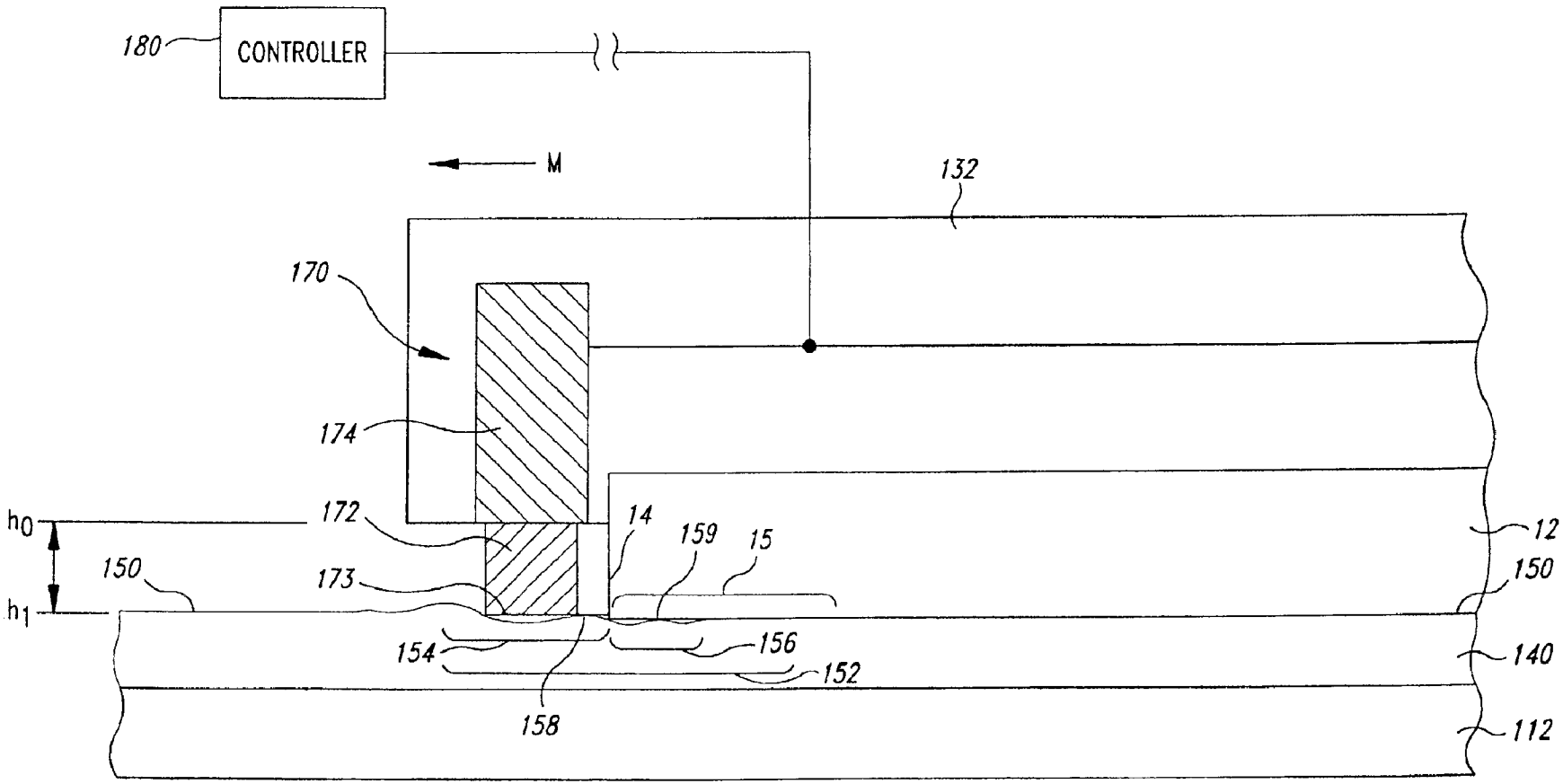
FIG. 4A is a partial schematic cross-sectional view illustrating the one aspect of the operation of the device of FIG. 3.

FIG. 4A is a schematic partial cross-sectional view illustrating the aforementioned possible application in which the contact element [170] *172* is held at a set position against the planarizing surface 150. In FIG. 4A, the controller 180 drives the actuator 174 to position the bottom surface 173 of the contact element 172 a distance h1 away from a reference height ho where the bottom surface 173 engages the exposed portion 154 of the standing wave 152. The actuator 174 may hold the bottom surface 173 in this position such that the force exerted by the contact element 172 against the exposed portion 154 changes the residual portion 156 of the standing wave 152 with respect to the perimeter region 15 of the substrate 12. Thus, in this possible application, the contact element 172 may be positioned to affect the boundary condition of the standing wave 152 in a manner that attenuates and/or changes the position of pressure points of the residual portion 156 with respect to the substrate 12.

Figure 4B:
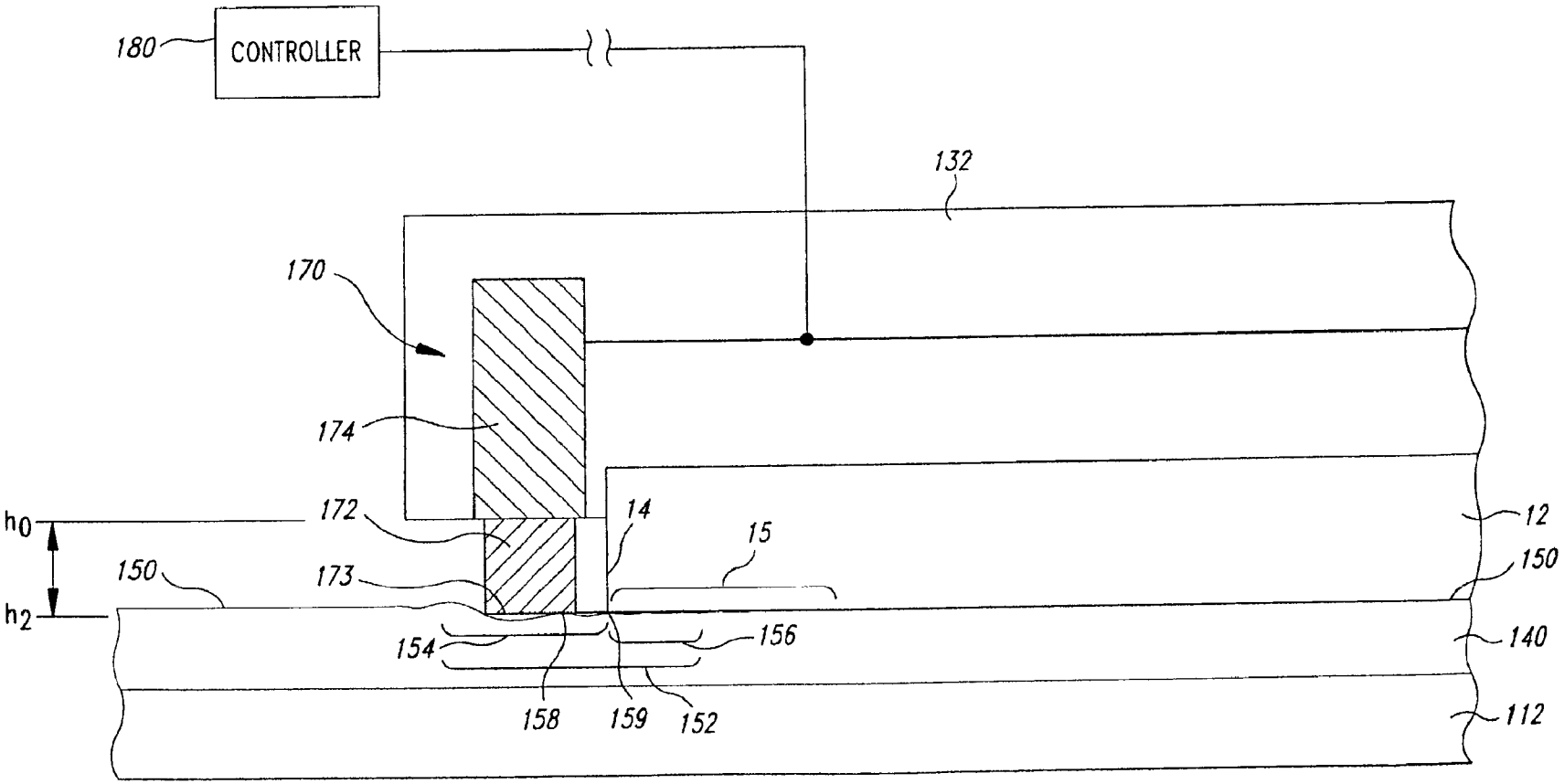
FIG. 4B is a partial schematic cross-sectional view illustrating another aspect of the operation of the device of FIG. 3.

FIG. 4B is another schematic cross-sectional view that, together with FIG. 4A, illustrates the aforementioned possible application in which the actuator 174 continuously moves the contact element 172 in engagement with the planarizing surface 150 to produce a plurality of different waveforms on the planarizing surface 150. In this application, the actuator 174 may move the bottom surface 173 of the contact element 172 between the position $h_1$ (FIG. 4A) and a position $h_2$ (FIG. 4B) at one or more frequencies to continuously alter the waveform on the planarizing surface. As such, the standing wave 152 on the planarizing surface 150 will be replaced by a number of different waves in which the pressure points act on different radial positions of the substrate 12. For example, if the actuator 174 moves the contact element 172 from the position $h_1$ to the position $h_2$ during planarization, a number of pressure points 158 and 159 may move with respect to the substrate. The actuator 174, accordingly, may move the contact element 172 during planarization to change the radial locations of the pressure points with respect to the substrate 12 so that the effects of the pressure points may be spread across a larger surface area of the substrate 12. In this application, therefore, the active modulator 170 is expected to reduce the concentration of a high pressure forces at relatively fixed radial positions on the substrate 12.

To program the controller 180 to drive the actuator 174, an operator may measure the planarity of the perimeter region 15 of a number of substrates that were planarized while holding the contact element 172 at a number of different set positions or moving the contact element 172 at a number of selected frequencies and amplitudes. Since the shape of the standing wave [150] *152* is a function of such factors as the pad type, substrate configuration, relative velocity, slurry distribution and down force, the particular position or movement of the contact element 172 may be determined empirically for each specific planarization process. Based upon the actual deviation in the surface uniformity of the perimeter region 15, and also based upon the size of the perimeter region 15, a person skilled in the art can determine the best position or motion of the contact element 172 to program into the controller 180.

The planarizing machine 100 with the active modulator 170 is expected to reduce the deviation in the surface uniformity in the perimeter region of a microelectronic substrate. Unlike conventional devices and methods for reducing the edge effect in planarization, several embodiments of the present invention are expected to enhance the uniformity of the substrate surface by altering the pressure exerted against the perimeter region of the substrate. The contact element 172, more particularly, may shift and/or attenuate the residual portion of the standing wave under the perimeter region 15 of the substrate 12 to reduce the concentration of high pressure points at substantially fixed radial positions on the substrate 12. As a result, the modulator 170 is expected to limit large deviations in the surface uniformity to a region approximately 2–5 mm from the substrate edge as opposed to the 5–15 mm perimeter region produced by conventional devices. Moreover, compared to conventional systems, the modulator 170 is also expected to reduce the extent of the deviations in surface uniformity in the 2–5 mm perimeter region. Thus, the planarizing machine 100 with the active modulator 170 is expected to increase the yield of operable dies on each substrate.

Figure 5A:
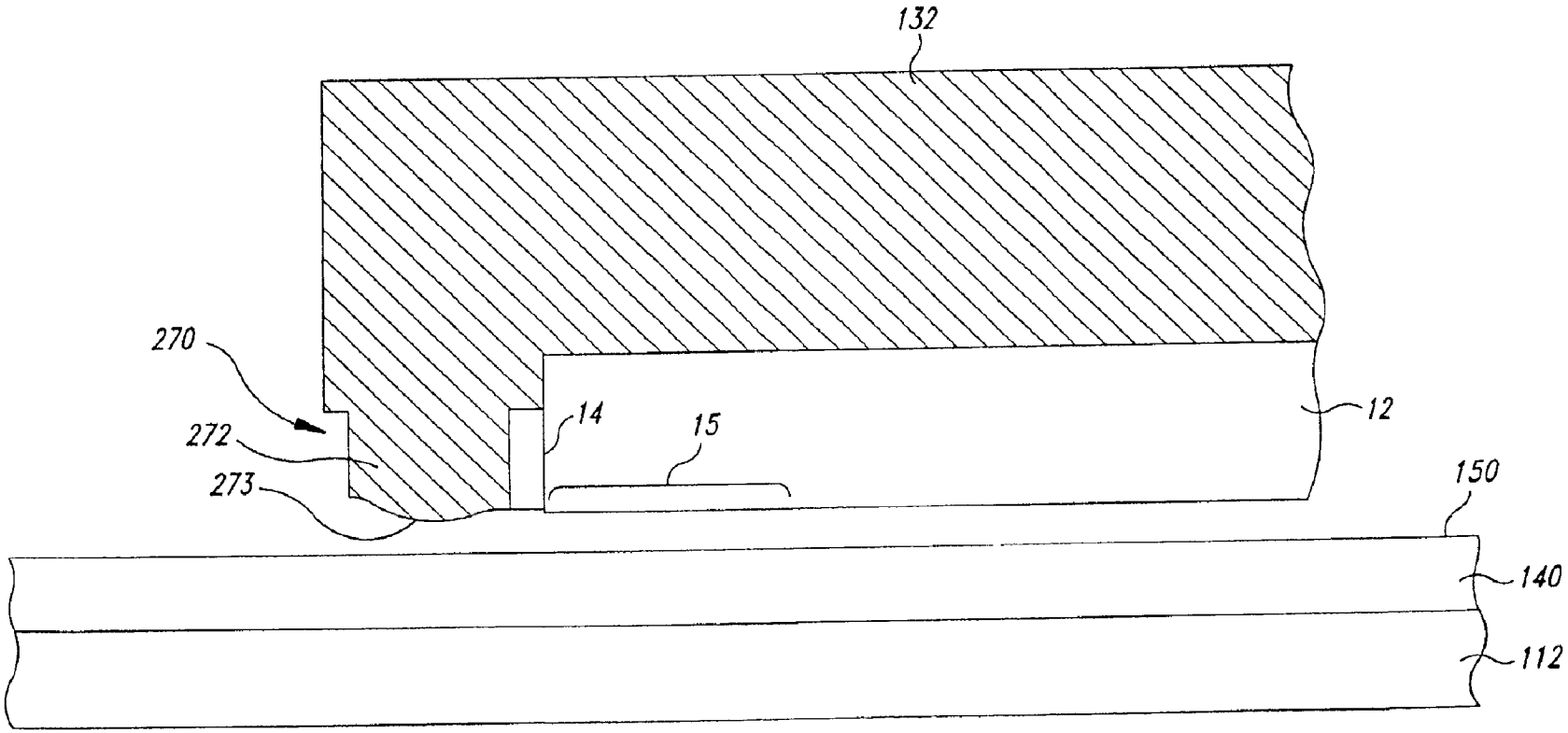
FIG. 5A is a partial schematic cross-sectional view of a planarizing machine with another device for controlling the planarizing characteristics of a microelectronic substrate in accordance with another embodiment of the invention.
Figure 5B:
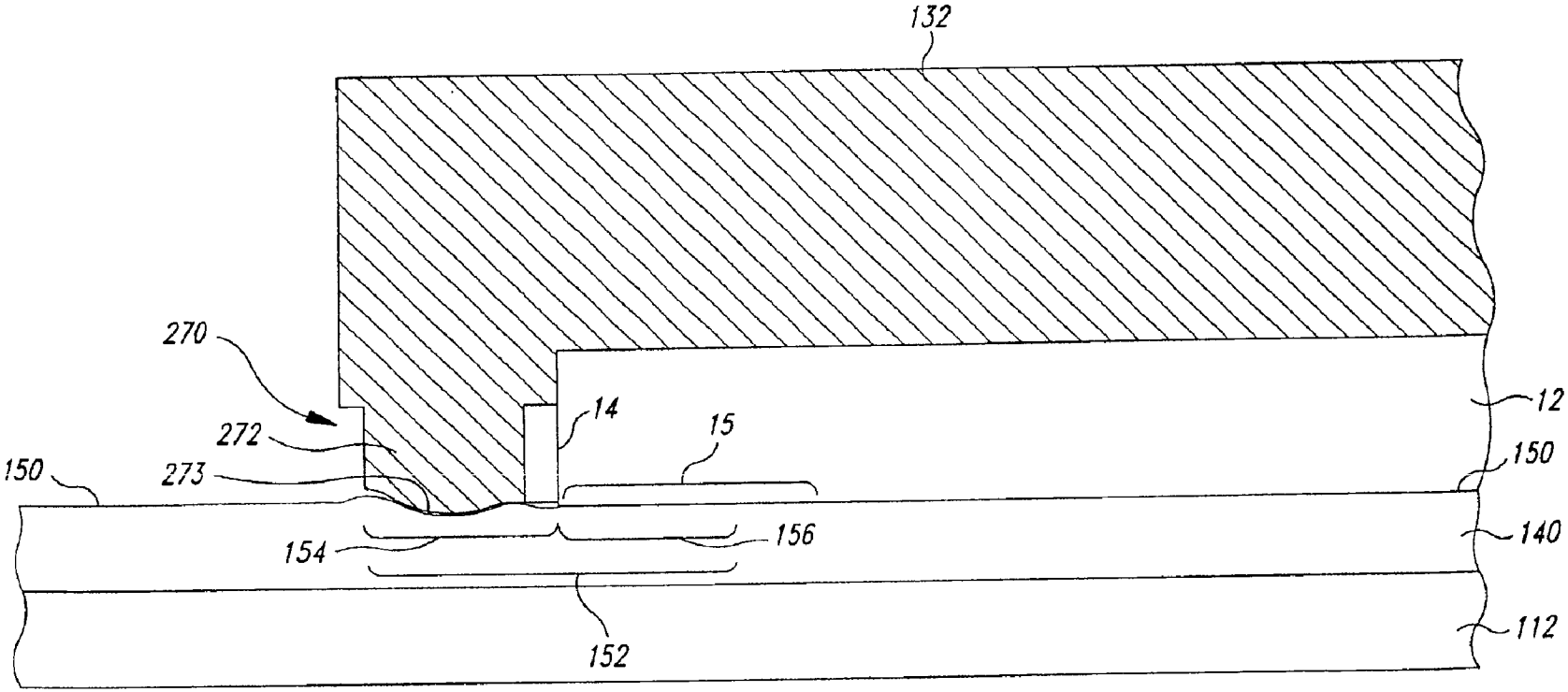
FIG. 5B is a partial schematic cross-sectional view illustrating the operation of the device of FIG. 5A.

FIGS. 5A and 5B are partial schematic cross-sectional views of another embodiment of a modulator 270 for controlling the planarizing characteristics of microelectronic substrates. Referring to FIG. SA, the modulator 270 may be a passive modulator in which the contact element 272 is fixedly attached to or integrally formed with the substrate holder 132. The contact element 272 may have a bottom surface 273 with a desired contour to modulate a residual portion 156 of the standing wave 152 on the planarizing surface 150 under the perimeter region 15 of the substrate 12. As described above with respect to determining the waveform for moving the active contact element 172, the contour of the bottom surface 273 may be determined empirically to shift or attenuate the residual portion 156 of the standing wave. Thus, the shape of the bottom surface 273 shown in FIGS. 5A and 5B is for illustrative purposes, and it will be appreciated that other shapes may be used to adapt the contact element 272 to the specific planarizing process. The width of the contact element 172 and its distance from the leading edge 14 of the substrate 12 can also be determined empirically at different operating conditions such as wafer velocity.

FIG. 5B illustrates the operation of the passive modulator 270 in which the substrate holder 132 presses the bottom surface 273 against the exposed portion 154 of the standing wave 152 on the planarizing surface 150. As described above, the shape of the bottom surface 273 may be configured either to attenuate and/or shift the residual portion 156 of the standing wave 152. Unlike the active modulator 170, however, the passive modulator 270 does not oscillate the pressure points of the residual portion 156 because the contact face 273 remains at the same elevation relative to the polishing pad 140 during planarization.

From the foregoing, it will be appreciated that specific embodiments of the invention have been described above for purposes of illustration, but that various modifications may be made without deviating from the spirit and scope of the invention. For example, the contact element 172 may be an integral part of the piezoelectric actuator 174. Additionally, the shape of the bottom surface 173 of the contact element 172 may also be contoured as shown by the bottom surface 273 of the contact element 272. Accordingly, the invention is not limited except as by the appended claims.

I claim:

[1. An apparatus for controlling planarizing characteristics of a microelectronic substrate, comprising:

a carrier positionable with respect to a polishing medium to move with a microelectronic substrate during planarization on a planarizing surface of the polishing medium, the carrier comprising a microelectronic substrate holder having a chuck and a rim; and a modulator having a contact element, the modulator being attached to the substrate holder to position the contact element radially outwardly from a perimeter edge of the substrate so that at least a portion of the contact element is in front of the leading edge of the substrate during planarization and superadjacent to an exposed portion of a standing wave on the planarizing surface, the modulator being configured to cause the contact element to selectively engage the exposed portion of the standing wave to modulate a contour of a residual portion of the standing wave on the planarizing surface under a perimeter region of the substrate, and wherein the modulator comprises a passive modulator and the contact element has a desired contour to attenuate an amplitude of the residual portion of the standing wave under the perimeter region of the substrate.]

[2. An apparatus for controlling planarizing characteristics of a microelectronic substrate, comprising:

a carrier positionable with respect to a polishing medium to move with a microelectronic substrate during planarization on a planarizing surface of the polishing medium, the carrier comprising a microelectronic substrate holder having a chuck and a rim; and a modulator having a contact element, the modulator being attached to the substrate holder to position the contact element radially outwardly from a perimeter edge of the substrate so that at least a portion of the contact element is in front of the leading edge of the substrate during planarization and superadjacent to an exposed portion of a standing wave on the planarizing surface, the modulator being configured to cause the contact element to selectively engage the exposed portion of the standing wave to modulate a contour of a residual portion of the standing wave on the planarizing surface under a perimeter region of the substrate, and wherein the modulator further comprises an active modulator having a controller and an actuator carrying the contact element, the controller driving the actuator to selectively move the contact element in engagement with the exposed portion of the standing wave in a manner that shifts a pressure point of the residual portion of the standing wave with respect to the substrate.]

3. An apparatus for controlling planarizing characteristics of a microelectronic substrate, comprising:

a carrier positionable with respect to a polishing medium to move with a microelectronic substrate during planarization on a planarizing surface of the polishing medium, the carrier comprising a microelectronic substrate holder having a chuck and a rim; and a modulator having a contact element, the modulator being attached to the substrate holder to position the contact element radially outwardly from a perimeter edge of the substrate so that at least a portion of the contact element is in front of the leading edge of the substrate during planarization and superadjacent to an exposed portion of a standing wave on the planarizing surface, the modulator being configured to cause the contact element to selectively engage the exposed portion of the standing wave to modulate a contour of a residual portion of the standing wave on the planarizing surface under a perimeter region of the substrate, and wherein the modulator further comprises [an active] *piezoelectric* modulator having a controller and an actuator carrying the contact element, the controller driving the actuator to selectively move the contact element in engagement with the exposed portion of the standing wave in a manner that continually shifts a pressure point of the residual portion of the standing wave with respect to the substrate.

[4. The apparatus of claim 3 wherein the actuator comprises a piezoelectric actuator.]

5. An apparatus for controlling planarizing characteristics of a microelectronic substrate, comprising:

a carrier positionable with respect to a polishing medium to move with a microelectronic substrate during planarization on a planarizing surface of the polishing medium, the carrier comprising a microelectronic substrate holder having a chuck and a rim; and a modulator having a contact element, the modulator being attached to the substrate holder to position the contact element radially outwardly from a perimeter edge of the substrate so that at least a portion of the contact element is in front of the leading edge of the substrate during planarization and superadjacent to an exposed portion of a standing wave on the planarizing surface, the modulator being configured to cause the contact element to selectively engage the exposed portion of the standing wave to modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that attenuates the residual portion of the standing wave under the substrate.

[6. The apparatus of claim 5 wherein the actuator comprises a piezoelectric actuator.]

7. An apparatus for controlling planarizing characteristics of a microelectronic substrate, comprising:

a carrier positionable with respect to a polishing medium to move with a microelectronic substrate during planarization on a planarizing surface of the polishing medium, the carrier comprising a microelectronic substrate holder having a chuck and a rim; and a modulator having a contact element, the modulator being attached to the substrate holder to position the contact element radially outwardly from a perimeter edge of the substrate so that at least a portion of the contact element is in front of the leading edge of the substrate during planarization and superadjacent to an exposed portion of a standing wave on the planarizing surface, the modulator being configured to cause the contact element to selectively engage the exposed portion of the standing wave to modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that attenuates the residual portion of the standing wave and continually shifts a pressure point of the residual portion of the standing wave with respect to the substrate.

[8. The apparatus of claim 7 wherein the actuator comprises a piezoelectric actuator.]

9. An apparatus for controlling planarizing characteristics of a microelectronic substrate, comprising:

a carrier positionable with respect to a polishing medium having a planarizing surface to move with a microelectronic substrate during planarization on the planarizing surface, *the carrier further including a microelectronic substrate holder having a chuck and a rim around the chuck*; and a pad surface regulator having a waveform surface, the regulator being attached to the [carrier] *substrate holder* to position [at least a portion of the waveform surface in front of a leading edge of the substrate by a selected distance] *the waveform surface radially outwardly from a perimeter edge of the substrate and being superadjacent to an exposed portion of a standing wave on the planarizing surface formed at the leading edge of the substrate* during planarization, [and the regulator being configured to cause the waveform surface to selectively engage the polishing medium] *the regulator engaging the waveform surface with the exposed portion of the standing wave to modulate a contour of a residual portion of the standing wave on the planarizing surface under a perimeter region of the substrate* to alter a contour of a planarizing surface of the polishing medium under a perimeter region of the substrate, *the regulator further comprising an active modulator having a controller and a piezoelectric actuator carrying the waveform surface, the actuator selectively moving the waveform surface in contact*

*with the exposed portion of the standing wave to define a dynamic waveform surface that attenuates the residual portion of the standing wave under the perimeter portion of the substrate.*

[10. The apparatus of claim 9 wherein the carrier comprises a microelectronic substrate holder having a chuck and a rim around the chuck, the regulator being attached to the substrate holder and the waveform surface being positioned radially outwardly from a perimeter edge of the substrate.]

[11. The apparatus of claim 10 wherein the regulator is attached to the substrate holder to position the waveform surface superadjacent to an exposed portion of a standing wave on the planarizing surface formed at the leading edge of the substrate during planarization, and wherein the regulator engages the waveform surface with the exposed portion of the standing wave to modulate a contour of a residual portion of the standing wave on the planarizing surface under a perimeter region of the substrate.]

12. The apparatus of claim [11] *9* wherein the regulator comprises a passive regulator and the waveform surface has a desired contour defining a static waveform to attenuate an amplitude of the residual portion of the standing wave under the perimeter region of the substrate.

13. The apparatus of claim [11] *9* wherein the regulator comprises a passive regulator and the waveform surface has a desired contour defining a static waveform to shift a pressure point of the residual portion of the standing wave with respect to the perimeter edge of the substrate.

14. The apparatus of claim [11] *9* wherein the regulator comprises an active modulator having a controller and an actuator carrying the waveform surface, the actuator selectively moving the waveform surface in contact with the exposed portion of the standing wave to define a dynamic waveform that shifts a pressure point of the residual portion of the standing wave with respect to the perimeter edge of the substrate.

15. The apparatus of claim [11] *9* wherein the regulator comprises an active modulator having a controller and an actuator carrying the waveform surface, the actuator selectively moving the waveform surface in contact with the exposed portion of the standing wave to define a dynamic waveform that continually shifts a pressure point of the residual portion of the standing wave with respect to the perimeter edge of the substrate.

[16. The apparatus of claim 15 wherein the actuator comprises a piezoelectric actuator.]

[17. The apparatus of claim 11 wherein the regulator comprises an active modulator having a controller and an actuator carrying the waveform surface, the actuator selectively moving the waveform surface in contact with the exposed portion of the standing wave to define a dynamic waveform surface that attenuates the residual portion of the standing wave under the perimeter portion of the substrate.]

[18. The apparatus of claim 17 wherein the actuator comprises a piezoelectric actuator.]

19. The apparatus of claim [11] *9* wherein the regulator comprises an active modulator having a controller and an actuator carrying the waveform surface, the actuator selectively moving the waveform surface in contact with the exposed portion of the standing wave to define a dynamic waveform that attenuates the residual portion of the standing wave under the perimeter portion of the substrate and continually shifts a pressure point of the residual portion of the standing wave with respect to the perimeter edge of the substrate.

[20. The apparatus of claim 19 wherein the actuator comprises a piezoelectric actuator.]

[21. An apparatus for controlling planarizing characteristics of a microelectronic substrate, comprising:

a carrier assembly having a support member positionable over a polishing medium and a substrate holder attached to the support member, the substrate holder having a chuck to hold a microelectronic substrate during planarization, and a modulator attached to the substrate holder, the modulator having a contact element spaced apart from a perimeter edge of the substrate and the modulator being configured to cause the contact element to selectively engage a region of the polishing medium, wherein the modulator is attached to the substrate holder to position the contact element superadjacent to an exposed portion of a standing wave on a planarizing surface of the polishing medium formed at the leading edge of the substrate during planarization and the contact element engages the exposed portion of the standing wave to selectively modulate a contour of a residual portion of the standing wave on the planarizing surface under a perimeter region of the substrate, and wherein the modulator further comprises an active modulator having a controller and an actuator carrying the contact element, the controller driving the actuator to selectively move the contact element in engagement with the exposed portion of the standing wave in a manner that shifts a pressure point of the residual portion of the standing wave with respect to the substrate.]

22. An apparatus for controlling planarizing characteristics of a microelectronic substrate, comprising:

a carrier assembly having a support member positionable over a polishing medium and a substrate holder attached to the support member, the substrate holder having a chuck to hold a microelectronic substrate during planarization; and a modulator attached to the substrate holder, the modulator having a contact element spaced apart from a perimeter edge of the substrate and the modulator being configured to cause the contact element to selectively engage a region of the polishing medium, wherein the modulator is attached to the substrate holder to position the contact element superadjacent to an exposed portion of a standing wave on a planarizing surface of the polishing medium formed at the leading edge of the substrate during planarization and the contact element engages the exposed portion of the standing wave to selectively modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that continually shifts a pressure point of the residual portion of the standing wave with respect to the substrate.

[23. The apparatus of claim 22 wherein the actuator comprises a piezoelectric actuator.]

24. An apparatus for controlling planarizing characteristics of a microelectronic substrate, comprising:

a carrier assembly having a support member positionable over a polishing medium and a substrate holder attached to the support member, the substrate holder having a chuck to hold a microelectronic substrate during planarization; and a modulator attached to the substrate holder, the modulator having a contact element spaced apart from a perimeter edge of the substrate and the modulator being configured to cause the contact element to selectively engage a region of the polishing medium, wherein the modulator is attached to the substrate holder to position the contact element superadjacent to an exposed portion of a standing wave on a planarizing surface of the polishing medium formed at the leading edge of the substrate during planarization and the contact element engages the exposed portion of the standing wave to selectively modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that attenuates the residual portion of the standing wave under the substrate.

[25. The apparatus of claim 24 wherein the actuator comprises a piezoelectric actuator.]

26. An apparatus for controlling planarizing characteristics of a microelectronic substrate, comprising:

a carrier assembly having a support member positionable over a polishing medium and a substrate holder attached to the support member, the substrate holder having a chuck to hold a microelectronic substrate during planarization; and a modulator attached to the substrate holder, the modulator having a contact element spaced apart from a perimeter edge of the substrate and the modulator being configured to cause the contact element to selectively engage a region of the polishing medium, wherein the modulator is attached to the substrate holder to position the contact element superadjacent to an exposed portion of a standing wave on a planarizing surface of the polishing medium formed at the leading edge of the substrate during planarization and the contact element engages the exposed portion of the standing wave to selectively modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that attenuates the residual portion of the standing wave and continually shifts a pressure point of the residual portion of the standing wave with respect to the substrate.

[27. The apparatus of claim 26 wherein the actuator comprises a piezoelectric actuator.]

[28. An apparatus for controlling planarizing characteristics of a microelectronic substrate, comprising:

a carrier assembly having a support member positionable over a polishing medium and a substrate holder attached to the support member, the substrate holder having a chuck to hold a microelectronic substrate during planarization; and a pad surface modulator attached to the substrate holder, the modulator having a waveform surface spaced apart from a perimeter edge of the substrate, the modulator being configured to cause the waveform surface to selectively engage the polishing medium to alter a contour of a planarizing surface of the polishing medium under a perimeter region of the substrate.]

[29. The apparatus of claim 28 wherein the modulator is attached to the substrate holder to position the waveform surface superadjacent to an exposed portion of a standing wave on the planarizing surface formed at the leading edge of the substrate during planarization, and wherein the modulator engages the waveform surface with the exposed portion of the standing wave to alter the contour of a residual portion of the standing wave on the planarizing surface under the perimeter region of the substrate.]

[30. The apparatus of claim 29 wherein the modulator comprises a passive modulator and the waveform surface has a desired contour defining a static waveform to attenuate the amplitude of the residual portion of the standing wave under the perimeter region of the substrate.]

[31. The apparatus of claim 29 wherein the modulator comprises a passive modulator and the waveform surface has a desired contour to shift a pressure point of the residual portion of the standing wave with respect to the perimeter edge of the substrate.]

[32. The apparatus of claim 29 wherein the modulator further comprises an active modulator having a controller and an actuator carrying the waveform surface, the actuator selectively moving the waveform surface in contact with the exposed portion of the standing wave to define a dynamic waveform that continually shifts a pressure point of the residual portion of the standing wave with respect to the perimeter edge of the substrate.]

[33. The apparatus of claim 29 wherein the modulator further comprises an active modulator having a controller and an actuator carrying the waveform surface, the actuator selectively moving the waveform surface in contact with the exposed portion of the standing wave to define a dynamic waveform that continually shifts a pressure point of the residual portion of the standing wave with respect to the perimeter edge of the substrate.]

[34. The apparatus of claim 29 wherein the modulator further comprises an active modulator having a controller and an actuator carrying the waveform surface, the actuator selectively moving the waveform surface in contact with the exposed portion of the standing wave to define a dynamic waveform that attenuates the residual portion of the standing wave under the perimeter portion of the substrate.]

[35. The apparatus of claim 29 wherein the modulator further comprises an active modulator having a controller and an actuator carrying the waveform surface, the actuator selectively moving the waveform surface in contact with the exposed portion of the standing wave to define a dynamic waveform that attenuates the residual portion of the standing wave under the perimeter portion of the substrate and continually shifts a pressure point of the residual portion of the standing wave with respect to the perimeter edge of the substrate.]

[36. A planarizing machine, comprising:

a table with a support base;

a polishing medium mounted on the support base;

a carrier assembly having a substrate holder positionable over the polishing medium, the substrate holder having a chuck to hold a microelectronic substrate, wherein at least one of the polishing medium and the substrate holder moves to translate a microelectronic substrate across a planarizing surface of the polishing medium during planarization; and a modulator attached to the substrate holder, the modulator having a contact element spaced apart from a perimeter edge of the substrate and the modulator being configured to cause the contact element to selectively engage a region of the planarizing surface proximate to the leading edge of the substrate as the substrate is planarized, wherein the modulator is attached to the substrate holder to position the contact element superadjacent to an exposed portion of a standing wave on the planarizing surface formed at the leading edge of the substrate during planarization and the modulator engages the contact element with the exposed portion of the standing wave to selectively modulate a contour of a residual portion of the standing wave on the planarizing surface under a perimeter region of the substrate, and wherein the modulator further comprises an active modulator having a controller and an actuator carrying the contact element, the controller driving the actuator to selectively move the contact element in engagement with the exposed portion of the standing wave in a manner that shifts a pressure point of the residual portion of the standing wave with respect to the substrate.]

37. A planarizing machine, comprising:

a table with a support base;

a polishing medium mounted on the support base;

a carrier assembly having a substrate holder positionable over the polishing medium, the substrate holder having a chuck to hold a microelectronic substrate, wherein at least one of the polishing medium and the substrate holder moves to translate a microelectronic substrate across a planarizing surface of the polishing medium during planarization; and a modulator attached to the substrate holder, the modulator having a contact element spaced apart from a perimeter edge of the substrate and the modulator being configured to cause the contact element to selectively engage a region of the planarizing surface proximate to the leading edge of the substrate as the substrate is planarized, wherein the modulator is attached to the substrate holder to position the contact element superadjacent to an exposed portion of a standing wave on the planarizing surface formed at the leading edge of the substrate during planarization and the modulator engages the contact element with the exposed portion of the standing wave to selectively modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with a dynamic waveform surface that contacts the exposed portion of the standing wave in a manner that continually shifts a pressure point of the residual portion of the standing wave with respect to the substrate.

[38. The apparatus of claim 37 wherein the actuator comprises a piezoelectric actuator.]

39. A planarizing machine, comprising:

a table with a support base;

a polishing medium mounted on the support base;

a carrier assembly having a substrate holder positionable over the polishing medium, the substrate holder having a chuck to hold a microelectronic substrate, wherein at least one of the polishing medium and the substrate holder moves to translate a microelectronic substrate across a planarizing surface of the polishing medium during planarization; and a modulator attached to the substrate holder, the modulator having a contact element spaced apart from a perimeter edge of the substrate and the modulator being configured to cause the contact element to selectively engage a region of the planarizing surface proximate to the leading edge of the substrate as the substrate is planarized, wherein the modulator is attached to the substrate holder to position the contact element superadjacent to an exposed portion of a standing wave on the planarizing surface formed at the leading edge of the substrate during planarization and the modulator engages the contact element with the exposed portion of the standing wave to selectively modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that attenuates the residual portion of the standing wave under the substrate.

[40. The apparatus of claim 39 wherein the actuator comprises a piezoelectric actuator.]

41. A planarizing machine, comprising:

a table with a support base;

a polishing medium mounted on the support base;

a carrier assembly having a substrate holder positionable over the polishing medium, the substrate holder having a chuck to hold a microelectronic substrate, wherein at least one of the polishing medium and the substrate holder moves to translate a microelectronic substrate across a planarizing surface of the polishing medium during planarization; and a modulator attached to the substrate holder, the modulator having a contact element spaced apart from a perimeter edge of the substrate and the modulator being configured to cause the contact element to selectively engage a region of the planarizing surface proximate to the leading edge of the substrate as the substrate is planarized, wherein the modulator is attached to the substrate holder to position the contact element superadjacent to an exposed portion of a standing wave on the planarizing surface formed at the leading edge of the substrate during planarization and the modulator engages the contact element with the exposed portion of the standing wave to selectively modulate a contour of a residual portion of the standing wave on the planarizing surface under a perimeter region of the substrate, and wherein the modulator further comprises an active modulator having a controller and [an] *a piezoelectric* actuator carrying the contact element, the controller driving the actuator to selectively move the contact element in engagement with the exposed portion of the standing wave in a manner that attenuates the residual portion of the standing wave and continually shifts a pressure point of the residual portion of the standing wave with respect to the substrate.

[42. The apparatus of claim 41 wherein the actuator comprises a piezoelectric actuator.]

[43. A planarizing machine, comprising:

a table with a support base;

a polishing medium mounted on the support base;

a carrier assembly having a substrate holder positionable over the polishing medium, the substrate holder having a chuck to hold a microelectronic substrate, wherein at least one of the polishing medium and the substrate holder moves to translate the microelectronic substrate across a planarizing surface of the polishing medium during planarization; and a pad surface modulator attached to the substrate holder, the modulator having a waveform surface spaced apart from a perimeter edge of the substrate, and the modulator being configured to cause the waveform surface to selectively engage the planarizing surface to alter a contour of the planarizing surface under a perimeter region of the substrate during planarization.

[44. The apparatus of claim 43 wherein the modulator is attached to the substrate holder to position the waveform surface superadjacent to an exposed portion of a standing wave on the planarizing surface formed at the leading edge of the substrate during planarization, and wherein the modulator engages the waveform surface with the exposed portion of the standing wave to alter the contour of a residual portion of the standing wave on the planarizing surface under the perimeter region of the substrate.]

[45. The apparatus of claim 44 wherein the modulator comprises a passive modulator and the waveform surface has a desired contour defining a static waveform to attenuate the amplitude of the residual portion of the standing wave under the perimeter region of the substrate.]

[46. The apparatus of claim 44 wherein the modulator comprises a passive modulator and the waveform surface has a desired contour to shift a pressure point of the residual portion of the standing wave with respect to the perimeter edge of the substrate.]

[47. The apparatus of claim 44 wherein the modulator further comprises an active modulator having a controller and an actuator carrying the waveform surface, the actuator selectively moving the waveform surface in contact with the exposed portion of the standing wave to define a dynamic waveform that shifts a pressure point of the residual portion of the standing wave with respect to the substrate.]

[48. The apparatus of claim 44 wherein the modulator further comprises an active modulator having a controller and an actuator carrying the waveform surface, the actuator selectively moving the waveform surface in contact with the exposed portion of the standing wave to define a dynamic waveform that continually shifts a pressure point of the residual portion of the standing wave with respect to the perimeter edge of the substrate.]

[49. The apparatus of claim 44 wherein the modulator further comprises an active modulator having a controller and an actuator carrying the waveform surface, the actuator selectively moving the waveform surface in contact with the exposed portion of the standing wave to define a dynamic waveform that attenuates the residual portion of the standing wave under the perimeter portion of the substrate.]

[50. The apparatus of claim 44 wherein the modulator further comprises an active modulator having a controller and an actuator carrying the waveform surface, the actuator selectively moving the waveform surface in contact with the exposed portion of the standing wave to define a dynamic waveform that attenuates the residual portion of the standing wave under the perimeter portion of the substrate and continually shifts a pressure point of the residual portion of the standing wave with respect to the perimeter edge of the substrate.]

[51. In microelectronic device manufacturing, a method for controlling edge uniformity in planarization processes using a polishing medium, comprising modulating the contour of a planarizing surface on the polishing medium in a region spaced outwardly from a leading edge of a microelectronic substrate while the substrate is being planarized on the polishing medium by engaging a contact element of a modulator with an exposed portion of a standing wave on the planarizing surface formed at the leading edge of the substrate during planarization to modulate the contour of a residual portion of the standing wave under a perimeter region of the substrate, and wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that shifts a pressure point of the residual portion of the standing wave under a perimeter region of the substrate.]

[52. In microelectronic device manufacturing, a method for controlling edge uniformity in planarization processes using a polishing medium comprising modulating the contour of a planarizing surface on the polishing medium in a region spaced outwardly from a leading edge of a microelectronic substrate while the substrate is being planarized on the polishing medium by engaging a contact element of a modulator with an exposed portion of a standing wave on the planarizing surface formed at the leading edge of the substrate during planarization to modulate the contour of a residual portion of the standing wave under a perimeter region of the substrate, and wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that oscillates a pressure point of the residual portion of the standing wave under a perimeter region of the substrate to reduce a pressure concentration exerted by the pressure point against an area in the perimeter region of the polishing pad.]

[53. In microelectronic device manufacturing, a method for controlling edge uniformity in planarization processes using a polishing medium, comprising modulating the contour of a planarizing surface on the polishing medium in a region spaced outwardly from a leading edge of a microelectronic substrate while the substrate is being planarized on the polishing medium by engaging a contact element of a modulator with an exposed portion of a standing wave on the planarizing surface formed at the leading edge of the substrate during planarization to modulate the contour of a residual portion of the standing wave under a perimeter region of the substrate, and wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that attenuates a pressure point of the residual portion of the standing wave under a perimeter region of the substrate.]

[54. In microelectronic device manufacturing, a method for controlling edge uniformity in planarization processes using a polishing medium, comprising modulating the contour of a planarizing surface on the polishing medium in a region spaced outwardly from a leading edge of a microelectronic substrate while the substrate is being planarized on the polishing medium by engaging a contact element of a modulator with an exposed portion of a standing wave on the planarizing surface formed at the leading edge of the substrate during planarization to modulate the contour of a residual portion of the standing wave under a perimeter region of the substrate, and wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that attenuates and shifts a pressure point of the residual portion of the standing wave under a perimeter region of the substrate.]

[55. In microelectronic device manufacturing, a method for controlling edge uniformity in planarization processes using a polishing medium, comprising selectively imparting a waveform to a region on a planarizing surface of the polishing medium proximate to a leading edge of a microelectronic substrate while the substrate is being planarized on the polishing medium, wherein imparting a waveform to the region of the planarizing surface comprises engaging a waveform surface of a modulator with an exposed portion of a standing wave on the planarizing surface formed at the leading edge of the substrate during planarization to modulate the contour of a residual portion of the standing wave under a perimeter region of the substrate.]

[56. The method of claim 55 wherein the modulator comprises a passive modulator and the waveform surface has a desired shape defining a static waveform to attenuate the amplitude of the residual portion of the standing wave wider the perimeter region of the substrate, and wherein engaging the waveform surface with the exposed portion of the standing wave comprises pressing the waveform surface against the exposed portion of the standing wave at a desired downforce.]

[57. The method of claim 55 wherein the modulator comprises a passive modulator and the waveform surface has a desired shape defining a static waveform to shift a pressure point of the residual portion of the standing wave under the perimeter region of the substrate, and wherein engaging the waveform surface with the exposed portion of the standing wave comprises pressing the waveform surface against the exposed portion of the standing wave at a desired downforce.]

[58. The method of claim 55 wherein the modulator comprises an active modulator having an actuator carrying the waveform surface and a controller coupled to the actuator, and wherein engaging the waveform surface with the exposed portion of the standing wave comprises selectively driving the actuator to press the waveform surface against the exposed portion of the standing wave along a dynamic waveform that shifts a pressure point of the residual portion of the standing wave under a perimeter region of the substrate.]

[59. The method of claim 55 wherein the modulator comprises an active modulator having an actuator carrying the waveform surface and a controller coupled to the actuator, and wherein engaging the waveform surface with the exposed portion of the standing wave comprises selectively driving the actuator to press the waveform surface against the exposed portion of the standing wave along a dynamic waveform that oscillates a pressure point of the residual portion of the standing wave under a perimeter region of the substrate to reduce a pressure concentration exerted by the pressure point against an area in the perimeter region of the substrate.]

[60. The method of claim 55 wherein the modulator comprises an active modulator having an actuator carrying the waveform surface and a controller coupled to the actuator, and wherein engaging the waveform surface with the exposed portion of the standing wave comprises selectively driving the actuator to press the waveform surface against the exposed portion of the standing wave along a dynamic waveform that shifts and attenuates a pressure point of the residual portion of the standing wave under a perimeter region of the substrate.]

[61. In microelectronic device manufacturing, a method of planarizing a microelectronic substrate, comprising:

pressing a microelectronic substrate against a planarizing surface of a polishing medium;

moving at least one of the substrate and the planarizing surface with respect to the other to move the substrate across the planarizing surface; and modulating the contour of the planarizing surface in a region spaced outwardly from a leading edge of the microelectronic substrate by engaging a contact element of a modulator with an exposed portion of a standing wave on the planarizing surface formed at the leading edge of the substrate during planarization to modulate the contour of a residual portion of the standing wave under a perimeter region of the substrate wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that shifts a pressure point of the residual portion of the standing wave under a perimeter region of the substrate.]

[62. In microelectronic device manufacturing, a method of planarizing a microelectronic substrate, comprising:

pressing a microelectronic substrate against a planarizing surface of a polishing medium;

moving at least one of the substrate and the planarizing surface with respect to the other to move the substrate across the planarizing surface; and modulating the contour of the planarizing surface in a region spaced outwardly from a leading edge of the microelectronic substrate by engaging a contact element of a modulator with an exposed portion of a standing wave on the planarizing surface formed at the leading edge of the substrate during planarization to modulate the contour of a residual portion of the standing wave under a perimeter region of the substrate, wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that oscillates a pressure point of the residual portion of the standing wave under a perimeter region of the substrate to reduce a pressure concentration exerted by the pressure point against an area in the perimeter region of the polishing pad.]

[63. In microelectronic device manufacturing, a method of planarizing a microelectronic substrate, comprising:

pressing a microelectronic substrate against a planarizing surface of a polishing medium;

moving at least one of the substrate and the planarizing surface with respect to the other to move the substrate across the planarizing surface; and modulating the contour of the planarizing surface in a region spaced outwardly from a leading edge of the microelectronic substrate by engaging a contact element of a modulator with an exposed portion of a standing wave on the planarizing surface formed at the leading edge of the substrate during planarization to modulate the contour of a residual portion of the standing wave under a perimeter region of the substrate, wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that attenuates a pressure point of the residual portion of the standing wave under a perimeter region of the substrate.]

[64. In microelectronic device manufacturing, a method of planarizing a microelectronic substrate, comprising:

pressing a microelectronic substrate against a planarizing surface of a polishing medium, moving at least one of the substrate and the planarizing surface with respect to the other to move the substrate across the planarizing surface, and modulating the contour of the planarizing surface in a region spaced outwardly from a leading edge of the microelectronic substrate by engaging a contact element of a modulator with an exposed portion of a standing wave on the planarizing surface formed at the leading edge of the substrate during planarization to modulate the contour of a residual portion of the standing wave under a perimeter region of the substrate, wherein the modulator comprises an active modulator having an actuator carrying the contact element and a controller coupled to the actuator, and wherein engaging the contact element with the exposed portion of the standing wave comprises selectively driving the actuator to move the contact element against the exposed portion of the standing wave in a manner that attenuates and shifts a pressure point of the residual portion of the standing wave under a perimeter region of the substrate.]

[65. In microelectronic device manufacturing, a method of planarizing a microelectronic substrate, comprising:

pressing a microelectronic substrate against a planarizing surface of a polishing medium;

moving at least one of the substrate and the planarizing surface with respect to the other to move the substrate across the planarizing surface; and selectively imparting a waveform to a region on the planarizing surface proximate to a leading edge of a microelectronic substrate by engaging a waveform surface of a modulator with an exposed portion of a standing wave on the planarizing surface formed at the leading edge of the substrate during planarization to modulate the contour of a residual portion of the standing wave under a perimeter region of the substrate, the imparted waveform altering a contour of the planarizing surface under a perimeter region of the substrate.]

[66. The method of claim 65 wherein the modulator comprises a passive modulator and the waveform surface has a desired shape defining a static waveform to attenuate the amplitude of the residual portion of the standing wave under the perimeter region of the substrate, and wherein engaging the waveform surface with the exposed portion of the standing wave comprises pressing the waveform surface against the exposed portion of the standing wave at a desired downforce.]

[67. The method of claim 65 wherein the modulator comprises a passive modulator and the waveform surface has a desired shape defining a static waveform to shift a pressure point of the residual portion of the standing wave under the perimeter region of the substrate, and wherein engaging the waveform surface with the exposed portion of the standing wave comprises pressing the waveform surface against the exposed portion of the standing wave at a desired downforce.]

[68. The method of claim 65 wherein the modulator comprises an active modulator having an actuator carrying the waveform surface and a controller coupled to the actuator, and wherein engaging the waveform surface with the exposed portion of the standing wave comprises selectively driving the actuator to press the waveform surface against the exposed portion of the standing wave along a dynamic waveform that shifts a pressure point of the residual portion of the standing wave under a perimeter region of the substrate.]

[69. The method of claim 65 wherein the modulator comprises an active modulator having an actuator carrying the waveform surface and a controller coupled to the actuator, and wherein engaging the waveform surface with the exposed portion of the standing wave comprises selectively driving the actuator to press the waveform surface against the exposed portion of the standing wave along a dynamic waveform that oscillates a pressure point of the residual portion of the standing wave under a perimeter region of the substrate to reduce a pressure concentration exerted by the pressure point against an area in the perimeter region of the substrate.]

[70. The method of claim 65 wherein the modulator comprises an active modulator having an actuator carrying the waveform surface and a controller coupled to the actuator, and wherein engaging the waveform surface with the exposed portion of the standing wave comprises selectively driving the actuator to press the waveform surface against the exposed portion of the standing wave along a dynamic waveform that shifts and attenuates a pressure point of the residual portion of the standing wave under a perimeter region of the substrate.]

* * * * *